A. McMULLEN.
GAME TRAP.
APPLICATION FILED APR. 14, 1919.
1,430,242.
Patented Sept. 26, 1922.
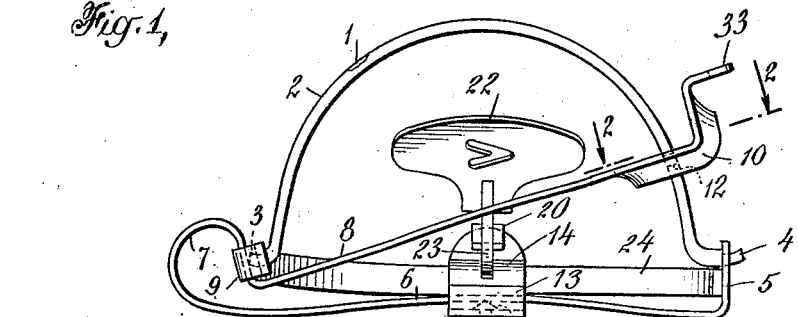
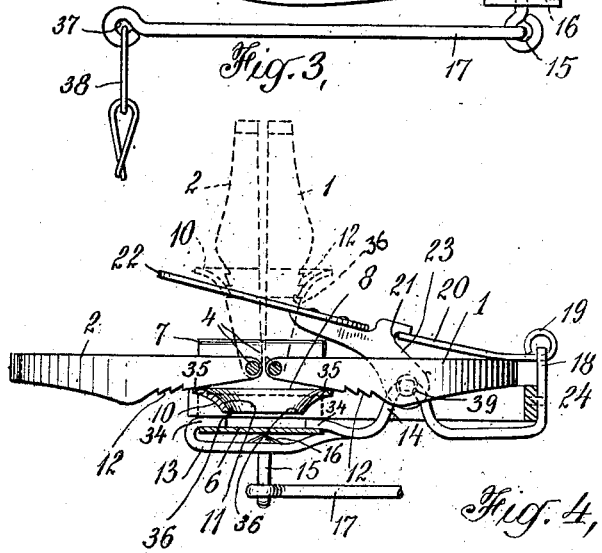
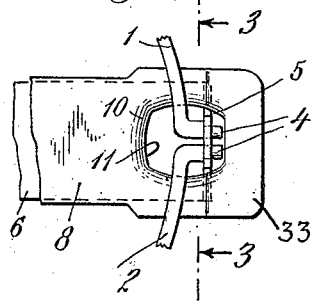
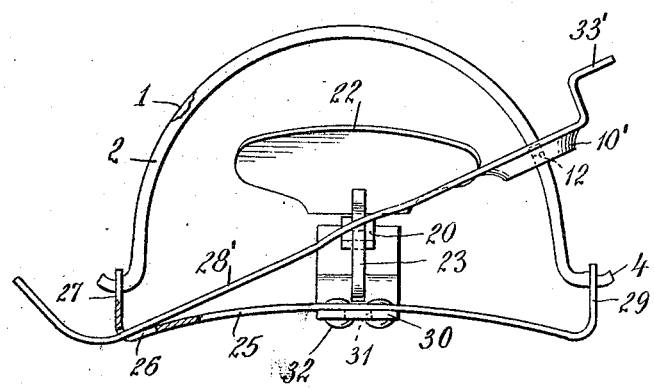
Inventor
Allen McMullen
By his Attorney
Harry L. Duncan Patented Sept. 26, 1922.

1,430,242

UNITED STATES PATENT OFFICE.

ALLEN McMULLEN, OF KENWOOD, NEW YORK, ASSIGNOR TO ONEIDA COMMUNITY, LIMITED, OF ONEIDA, NEW YORK, A CORPORATION OF NEW YORK.

GAME TRAP.

Application filed April 14, 1919. Serial No. 289,932.

*To all whom it may concern:*

Be it known that I, ALLEN MCMULLEN, a British subject, now residing at Kenwood, Madison County, State of New York, have made a certain new and useful Invention Relating to Game Traps, of which the following is a specification, taken in connection with the accompanying drawing, which forms part of the same.

This invention relates especially to jaw traps of the jump trap type and the one or more pivoted jaws may be mounted in any desired way so as to be forcibly closed by the action of a suitable jaw spring when the trap is sprung. The jaw spring is preferably formed with a downwardly flanged jaw opening through which the jaws extend during the closing operation and this flaring hole thus constitutes a jaw funnel or closing opening having desirable cooperation with the pivoted or other jaws of the trap. It is also possible in this way to form this part of the jaw spring with relatively separated jaw starting or edge portions cooperating with the jaws in set position so as to initiate their closing movement while the inner surface of the jaw funnel or opening in the spring with which the jaws cooperate which is preferably of gradually curved contour may be formed with a locking detent or edge portion adapted to more or less grip the jaws when they are substantially closed or engage an animal, and for this purpose the jaws may be formed with locking notches or members, if desired. It is also advantageous to have jaw traps of this jump trap type in which the spring or other members extend only slightly beyond the jaws provided with a centrally located draft swivel cooperating with the bottom spring or other member of the trap and preferably directly connected with a substantially rigid spacing link or member of such length as to extend beyond any of the elements of the trap bottom, so that the draft chain or flexible securing member of any desired character is to a corresponding extent held out of contact with the jaws, springs or other parts of the trap and tangling or cramping prevented or minimized to a corresponding extent.

The accompanying drawings showing in a somewhat diagrammatic way various illustrative embodiments of the invention, Fig. 1 is a side elevation of one form of trap in sprung position.

Fig. 2 is a partial view taken substantially along the line 2—2 of Fig. 1 when the trap is in set position.

Fig. 3 is a transverse section taken substantially along the line 3—3 of Fig. 2 showing the trap in set position; and Fig. 4 is a side elevation showing another form of trap partly in section.

The jump or other type or trap may have any suitable jaws, such as 1, 2, which may, if desired, have pivotal portions, such as 3, or the reduced diameter pivots 4 cooperating with the frame or other members of the trap. As indicated in Figs. 1 and 2 these jaws pivots 4 may extend through the upturned end or pivotal portion 5 of the bottom spring 6 which may be formed on its other end with a spring loop 7 merging into the jaw spring 8. The other jaw pivots 3 may engage suitable bearings or holes in the jaw bracket 9 secured in position to or adjacent the spring loop 7 in any desired way and if preferred this bracket may be secured to or formed integral with the frame member or soft steel strip 24 extending around one or both sides of the trap and secured to the other members as by riveting, welding or the like. As shown in Fig. 3, the metallic support member 14 may be riveted or secured to the frame member 24 and may have an intermediate upwardly extending portion provided with the bearing 39 pivotally supporting the pan lever 23 to which the trap pan 22 may be riveted or otherwise secured in any usual or desired way. The catch 21 in this pan lever may as indicated in Fig. 3 cooperate with the trigger or detent member 20 pivoted to the trigger support 18 so that under these conditions it holds the jaw 1 in set or open position so that the trap spring is prevented from closing the two jaws until the pan is depressed sufficiently to spring the trap.

It is desirable to have the jaw opening in the spring formed of flaring shape throughout the portion which engages the jaws during the closing operation and as indicated in Figs. 1 and 3 this may be conveniently secured by stamping or otherwise bending this apertured part 10 of the jaw spring so that it has a generally funnel shape or curved inner surface 11 of considerable depth as much as several times the thickness of the spring strip in some cases, while these edges of the jaw spring may be of substantially the same thickness and condition as before this bending operation. In this way the outer or edge portions 35 of the jaw spring at the points where they engage the trap jaws 1, 2 are relatively separated as compared to the inner or final holding portions 36 which as shown in dotted lines in Fig. 3 engage the jaws when they are in substantially closed or gripping engagement with an animal after the trap is sprung. In this way a relatively increased starting leverage is secured so that the initial power of the jaw spring is very materially increased and it is enabled to more effectively overcome the starting inertia of the jaws. During the closing movement the jaws ride over the curved inner surface 11 of this closing funnel or portion so that the leverage progressively decreases during this operation and finally the inner edges 36 of this jaw opening come into engagement with the jaws and if the hardened or tempered steel of which they are formed is given a sufficiently sharp edge they may in many cases sufficiently nick or bite into the jaws to have a decidedly increased locking or holding action in preventing accidental or undesirable opening of the jaws. This locking action may, however, be increased by forming the locking notches or members, such as 12, on one or both of the jaws in such position as to be engaged by the locking detents or edge portions of the jaw spring when the jaws are nearly or substantially closed. The size and wideness of spacing of these locking notches is considerably exaggerated in Fig. 3 for the sake of clearness. Where as indicated in Fig. 1 the jaw spring is bent upward adjacent the jaw opening to form a setting lug or member 33 it is sometimes desirable to have the flanged portion of the jaw opening extend around this bend which stiffens and strengthens this part of the spring through which the pivotal portion or upturned end 5 of the bottom member or spring may project when the trap is set as indicated in Fig. 2.

It is quite desirable in order to prevent tangling or cramping of the draft or securing chain of the trap to provide a pivotal or swinging connection between the chain and one of the trap members adjacent the center of the trap bottom and to provide a rigid spacing link or member of sufficient length to carry the chain proper out beyond any projecting portions of the trap to further minimize this tangling or cramping action. As indicated in Figs. 1 and 3, the draft swivel 15 may for this purpose be formed with the head 16 on the other side of the securing portion 13 of the support member 14 and this head is preferably of generally conical shape so that its small central portion or point can have a relatively free movement in case it engages the bottom spring 6 in its rotation within this chamber which may be formed of ample height to loosely accommodate it. The swivel may be riveted through this support member which may then be secured to the bottom spring as by forcing or bending down on both sides of the spring the securing lugs 34 which may be formed or struck up from the edges of the member 13. The spacing member may, if desired, be in the form of a relatively stiff link of steel or other wire stock 17 having an eye or closed portion engaging the draft swivel 15 and a similar eye, such as 37, on its other end to which may be secured the draft or securing chain 38 of the trap of any desired construction. As indicated in Fig. 1 this rigid spacing link or member should for best results be given ample length so that it carries the connected draft chain out beyond any projecting springs or other portions of the trap so that twisting or other movement of the animal cannot so readily entangle or lock the chain around the trap and so cramp the parts as to enable the animal to break its leg or pull out of the trap. A spacing link of this character is also advantageous where the trap chain is secured to a stake since even when the chain is wound up around the stake the spacing link finally prevents the trap being brought so close to the stake as to prevent the free swishing movement of the trap around the draft swivel which correspondingly prevents undersirable injury or escape of the animal.

Fig. 4 shows another form of the invention in which the jaws 1, 2, may be provided with integral pivotal portions engaging pivot holes or openings in the upstanding ends 27, 29 of the bottom member 25 which may, if desired, be of spring steel strip. The trap pan 22 may be mounted by the pan lever 23 in a support member 30 secured as by the rivets 32 to the bottom member and being formed, if desired, with a securing or swivel hole 31. The jaw spring 28' may, if desired, extend through a spring hole 26 in the bottom member and may be formed with a downwardly flaring or funnel shaped jaw opening 10' so that it may cooperate with one or more locking notches 12 formed in the corresponding part of the jaws when the trap is sprung. As indicated this jaw spring 28' may in some cases be substantially straight throughout the portion in which the jaw opening 10' is formed and may in some cases be bent upward beyond the jaw opening so as to form an upstanding setting lug 33' which is of advantage in facilitating the opening and setting of the trap.

This invention has been described in connection with a number of illustrative embodiments, forms, parts, proportions, sizes, materials, and methods of connection, operation and use, to the details of which disclosure the invention is not of course to be limited, since what is claimed as new and what is desired to be secured by Letters Patent is set forth in the appended claims:

1. The jump trap comprising a frame, a pair of trap jaws formed with pivotal portions connected to said frame, a cooperating jaw spring formed with a funnel shaped jaw opening to provide relatively separated jaw starting edge portions engaging the jaws when the trap is in set position and formed with locking portions to engage the jaws when the trap is in its substantially closed sprung position.

2. The jump trap comprising a frame, a pair of trap jaws formed with pivotal portions connected to said frames, a cooperating jaw spring formed with a flaring jaw opening to provide relatively separated jaw starting edge portions engaging the jaws when the trap is in set position.

3. The trap comprising a frame, a pair of trap jaws formed with pivot portions, a cooperating jaw spring of spring steel strip formed with a curved funnel shaped jaw opening flanged down in said strip to provide relatively separated jaw starting edge portions engaging the jaws when the trap is in set position, and formed with relatively closely spaced sharp locking edge portions to engage the jaws when the trap is in its substantially closed sprung position.

4. The trap comprising a frame, a pair of trap jaws, a cooperating jaw spring of spring steel strip formed with a curved funnel shaped jaw opening flanged down in said strip to provide relatively separated jaw starting portions engaging the jaws when the trap is in set position, and formed with relatively closely spaced portions to engage the jaws when the trap is in its substantially closed sprung position.

5. The trap comprising a frame, a trap jaws, a cooperating jaw spring formed with relatively separated jaw starting members engaging the jaws when the trap is in set position, and formed with relatively closely spaced members to engage the jaws when the trap is in its substantially closed sprung position.

6. The jump trap comprising spring operated trap jaws and a connected trap bottom member, a swivel secured adjacent to the center of the trap bottom, a relatively rigid spacing link loosely connected to said swivel and having a free end extended out beyond the trap bottom to be connected to the securing chain of the trap to keep said chain away from the projecting portions of the trap and minimize tangling and cramping engagement therewith.

7. The jaw trap comprising spring operated trap jaws, a securing chain and a substantially rigid spacing member of such length as to extend adjacent the outer edge of the trap bottom and connected to said chain and loosely and swivelingly connected adjacent the center of the trap bottom to minimize tangling and cramping of the chain.

8. The trap comprising a securing chain and a substantially rigid spacing member extending out beyond the trap and connected to said chain and loosely connected to the trap to minimize tangling and cramping of the chain.

9. The jaw trap comprising spring operated trap jaws, a flexible securing member and a substantially rigid spacing member of such length as to extend adjacent the outer edge of the trap bottom and connected to said securing member and swivelingly connected to the trap bottom to minimize tangling and cramping of the chain.

ALLEN McMULLEN.